(12) United States Patent
Marcato

(10) Patent No.: US 6,372,179 B1
(45) Date of Patent: Apr. 16, 2002

(54) METAL PLATE CUTTING MACHINE

(75) Inventor: Paolo Marcato, Abano Terme (IT)

(73) Assignee: Promotec S.r.l., Selvazzano Dentro (IT)

( * ) Notice: Subject to any disclaimer, the term of this patent is extended or adjusted under 35 U.S.C. 154(b) by 0 days.

(21) Appl. No.: 09/609,896

(22) Filed: Jul. 3, 2000

(30) Foreign Application Priority Data

Jul. 27, 1999 (IT) .......................................... 99A000176

(51) Int. Cl.[7] ................................................. B23K 7/10
(52) U.S. Cl. .......................................... 266/69; 266/77
(58) Field of Search .............................. 266/69, 77, 48

(56) References Cited

U.S. PATENT DOCUMENTS

| | | | | |
|---|---|---|---|---|
| 3,564,971 A | | 2/1971 | Wagner et al. | |
| 3,866,892 A | * | 2/1975 | Hooper | 266/69 |
| 4,121,808 A | * | 10/1978 | Cardea | 266/69 |
| 4,139,180 A | * | 2/1979 | Itani et al. | 266/69 |
| 5,560,843 A | * | 10/1996 | Koike et al. | 266/77 |
| 5,854,460 A | | 12/1998 | Graf et al. | |
| 6,245,284 B1 | * | 6/2001 | Cooper, Sr. | 266/77 |

* cited by examiner

Primary Examiner—Scott Kastler
(74) Attorney, Agent, or Firm—Guido Modiano; Albert Josif; Daniel O'Byrne

(57) ABSTRACT

A machine for cutting metal plates by laser, plasma, water and/or oxygen cutting, comprising, on a supporting platform, at least two rails for longitudinal translatory sliding of a portal-like structure for slidingly supporting at least one cutting head which is associated with a control unit. The portal-like structure is mounted on a supporting assembly whose position can be adjusted along at least two axes.

9 Claims, 8 Drawing Sheets

METAL PLATE CUTTING MACHINE

BACKGROUND OF THE INVENTION

The present invention relates to a metal plate cutting machine, particularly but not exclusively useful for cutting metal plates by means of laser, plasma, water, and/or oxygen cutting.

Conventional metal plate cutting machines are currently advantageously used which employ tools whose structure, differently from conventional machines, is not "solid" but rather constituted by matter in particular states which are adapted for cutting solid objects; for example, in the case of the laser the tool is constituted by a coherent beam of monochromatic photons.

However, regardless of the technology used, these machines are employed to cut metal plates, even large ones (for example on the order of several meters in length and up to 5–6 meters wide), and usually comprise, on a supporting platform, at least two rails for the longitudinal sliding of a portal-like structure for supporting and moving at least one cutting head associated with a control unit.

The cutting head, on command of the control unit and of associated movement means, is guided so as to travel along the entire length of the portal-like structure.

In particular, the portallike structure is in turn capable of sliding, under the actuation of dedicated movement means, along two guides which are arranged on two mutually opposite sides of the platform.

In this way, the cutting head is capable of positioning itself in any point within the platform, by means of the combined sliding along the transverse axis (formed by the portal and usually designated as Y axis) and along the longitudinal axis (formed by the two guides arranged at the sides of the platform and usually termed X axis).

In all of these machines designed to cut metal plates, the cutting head is actually mounted at a vertical axis (hereinafter termed Z axis), along which it can slide up and down with respect to the platform.

In this way, the movement of the cutting head can occur along three mutually perpendicular axes (designated respectively X-Y-Z, as above-described), and this allows to reach any point in the space above the platform.

The cutting head, appropriately actuated by the control unit for example by numeric control, must in fact be capable of following a preset path on the metal plate, so as to perform the cut according to the instructions set by the operator.

The path followed by the cutting head is determined by the spatial coordinates X-Y-Z of the positions reached by the cutting head respectively along the X axis, the Y axis and the Z axis.

As regards vertical movement, Z axis, during the cutting operations the head must absolutely remain always at the same distance from the metal plate; due to the thermal deformation or stress to which it is subjected, or due to a lack of perfect flatness, the head can instead be affected by slight displacements and/or local cambering/bending.

During the cutting operations, therefore, the head slides with respect to the Z axis so as to always remain at the same distance from the metal plate.

One of the most significant problems in the production of current large machines is the alignment (parallelism and co-planarity) of the tracks along the X axis on which the portal-like structure or machine body slides, since the straightness of the cut and the durability of the sliding guides over time depends on this.

SUMMARY OF THE INVENTION

The aim of the present invention is to provide a machine for cutting and machining metal plates which effectively solves the above-described drawbacks in conventional machines, in particular in relation to the alignment (parallelism and co-planarity) of the tracks along the X axis on which the portal-like structure or machine body slides, in order to ensure the straightness of the cut and the durability of the sliding guides over time.

Within the scope of this aim, an object of the present invention is to provide a machine whose alignment, as regards the cutting head, is independent of the co-planarity and parallelism of the tracks, thus maintaining a high degree of precision during work.

A further object of the present invention is to provide a machine which is structurally simple and at the same time sturdy.

A further object of the present invention is to provide a machine for cutting metal plates which is easy to use for the operator.

Still a further object of the present invention is to provide a machine for cutting metal plates by plasma, laser, water and/or oxygen cutting which can be produced with conventional equipment and structures.

These and other objects which will become better apparent hereinafter are achieved by a machine for cutting metal plates by laser, plasma, water and/or oxygen cutting, comprising, on a supporting platform, at least two rails for the longitudinal translatory sliding of a portal-like structure for slidingly supporting at least one cutting head which is associated with a control unit, characterized in that said portal-like structure is mounted on a supporting assembly whose position can be adjusted along at least two axes.

Advantageously, the supporting assembly comprises four supports with a spherical articulation, at least one of which is associated, so as to form a vertically adjustable support for the structure, with extendible means available for operator adjustment, movement means being provided for the operating of the structure and of the corresponding at least one cutting head.

BRIEF DESCRIPTION OF THE DRAWINGS

Further characteristics and advantages of the present invention will become better apparent from the following detailed description of a preferred embodiment thereof, illustrated only by way of non-limitative example in the accompanying drawings, wherein.

DESCRIPTION OF THE PREFERRED EMBODIMENTS

Figure 1:
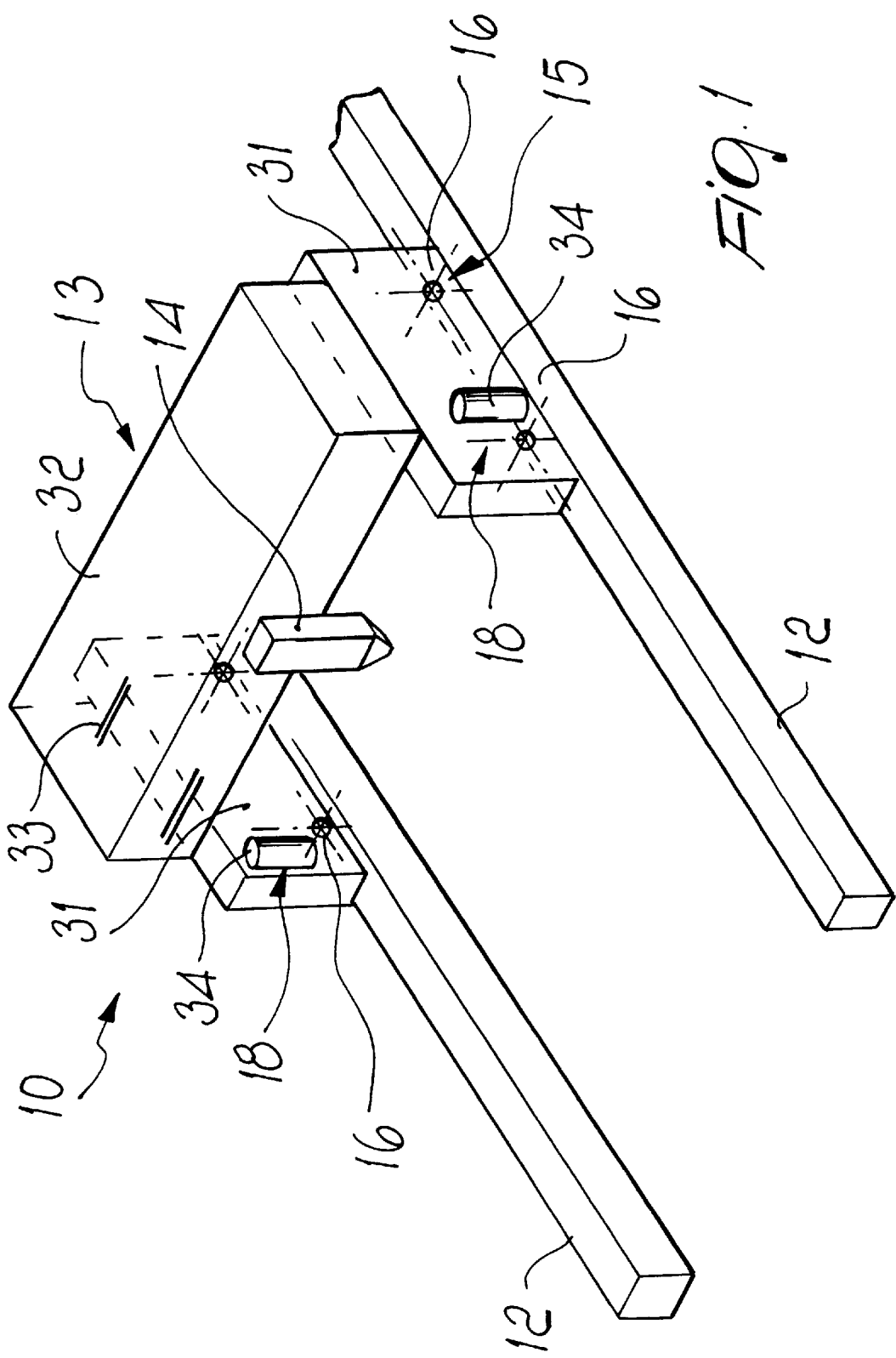
FIG. 1 is a perspective view of a metal plate cutting machine according to the present invention.
Figure 2:
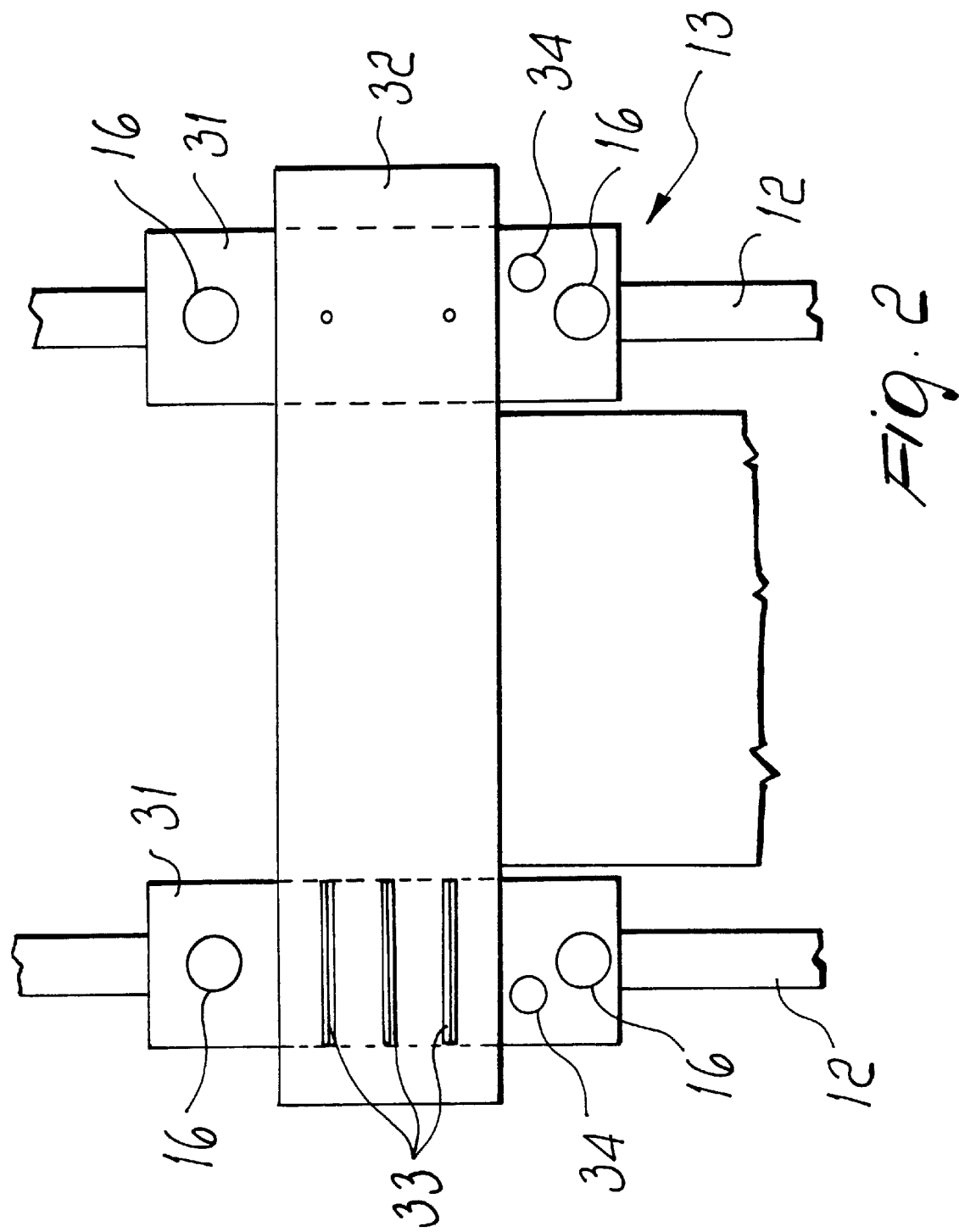
FIG. 2 is a plan view of the machine.
Figure 3:
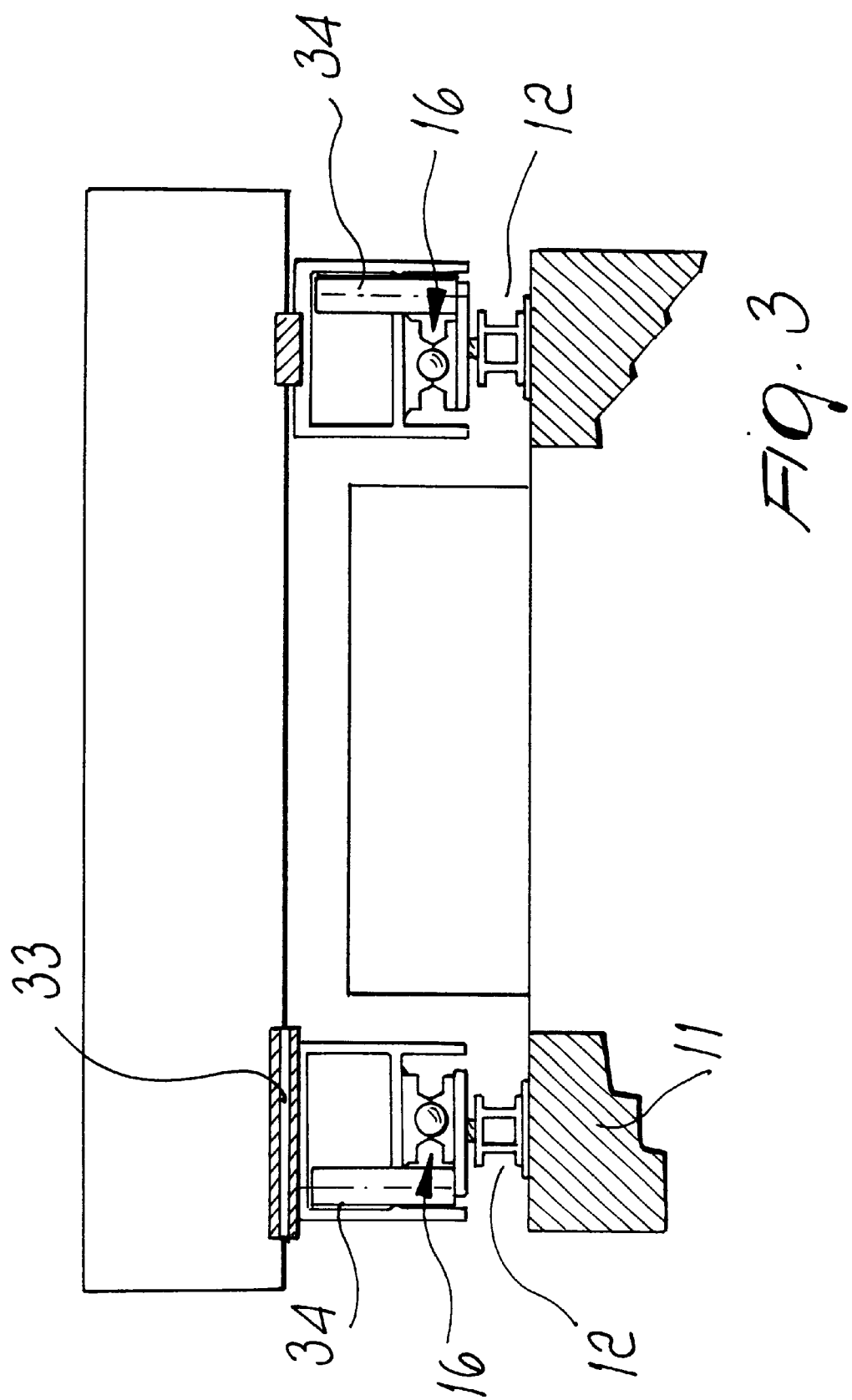
FIG. 3 is a front view of the machine.
Figure 4:
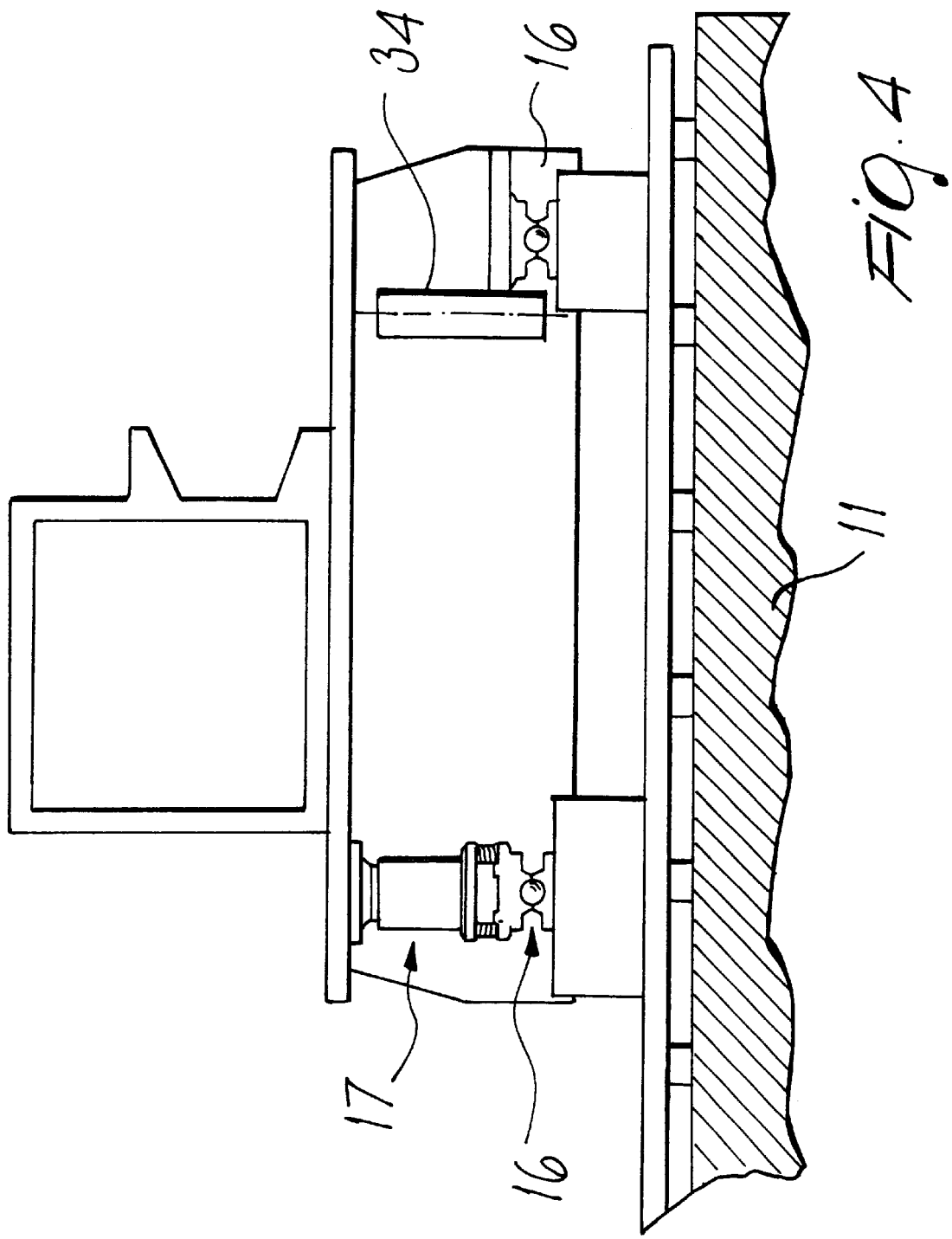
FIG. 4 is a side view of the machine, taken from the left.
Figure 5:
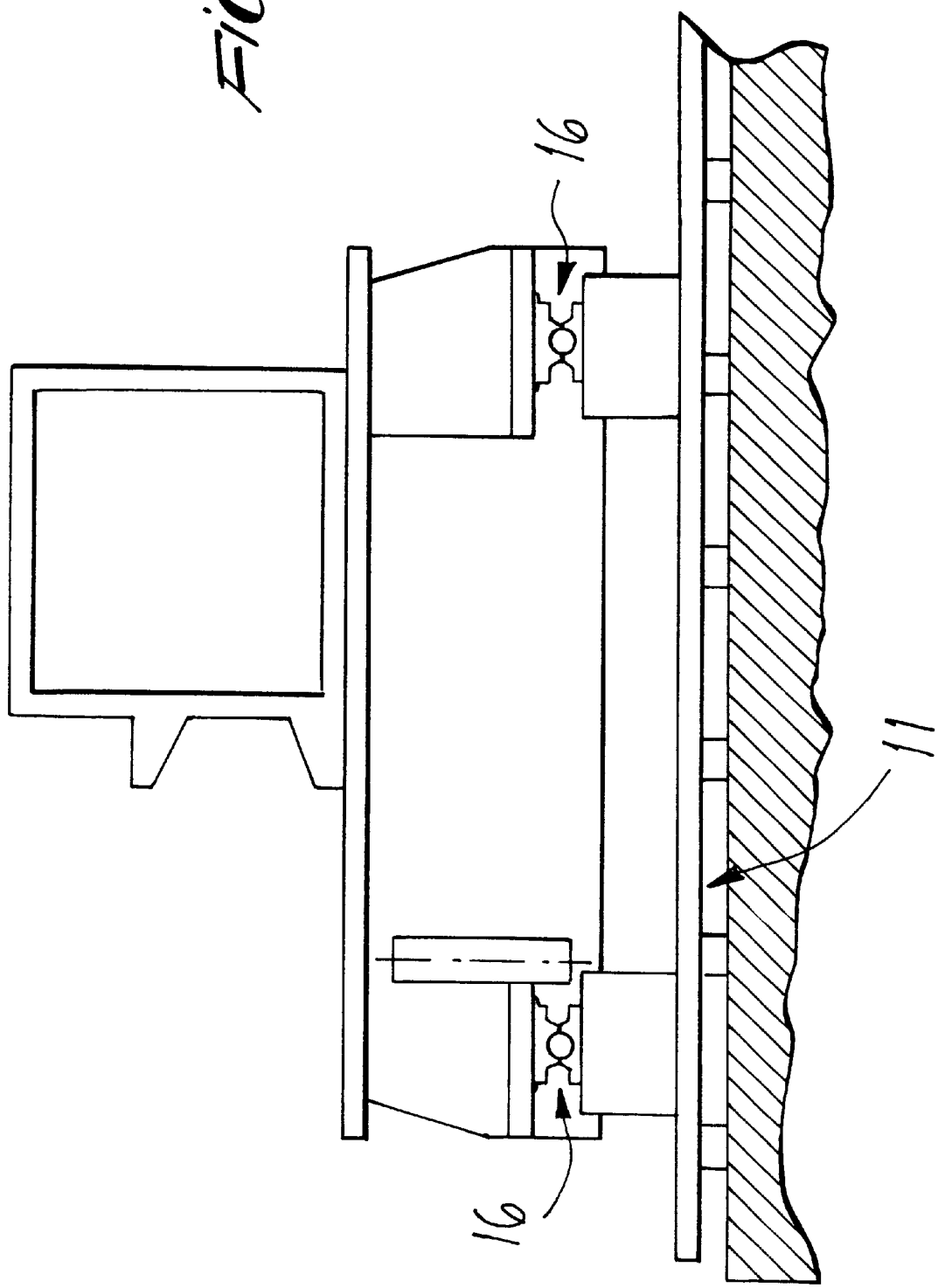
FIG. 5 is a side view of the machine, taken from the right.
Figure 6:
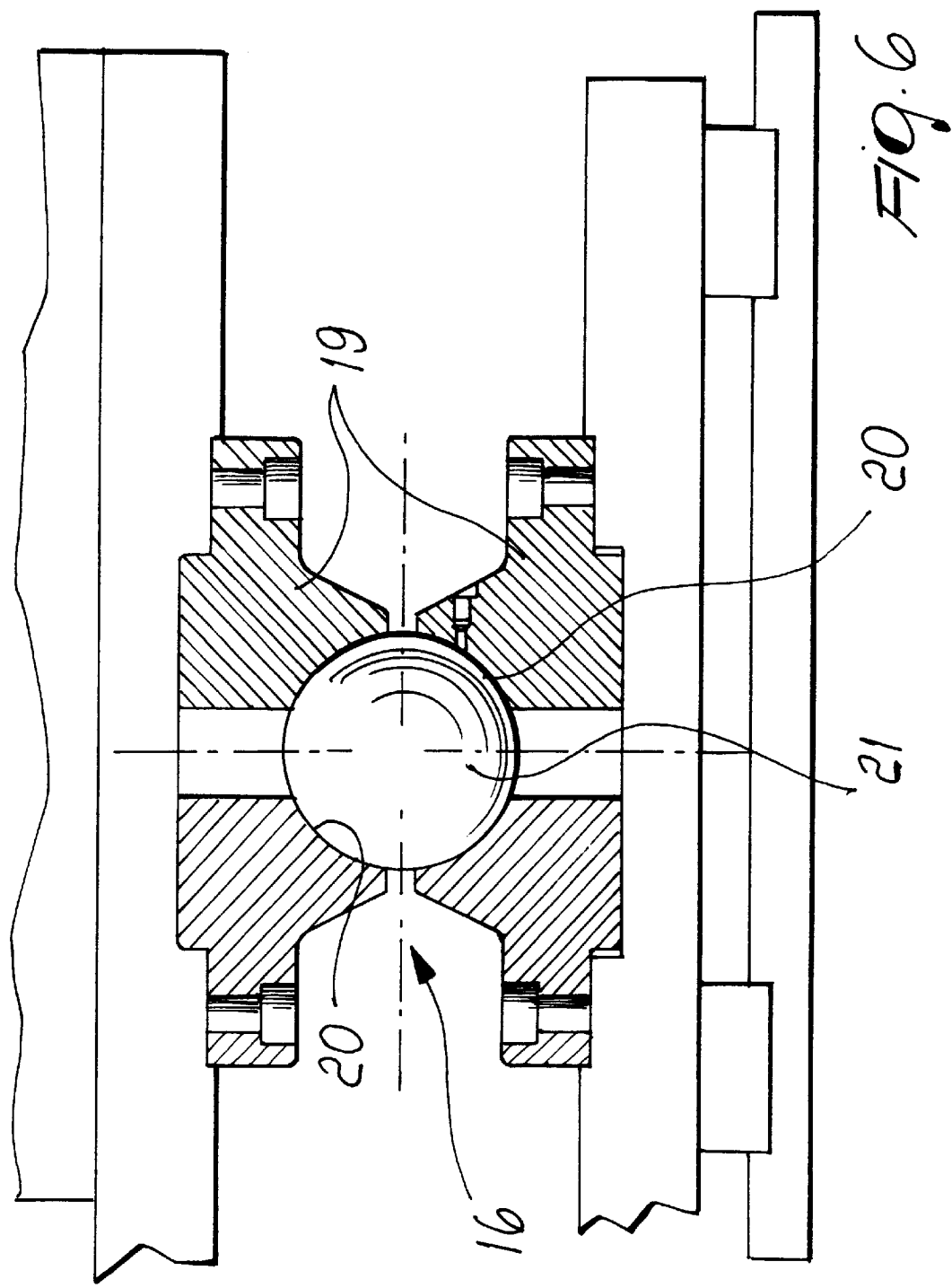
FIG. 6 is a view of a detail of the spherical support of the machine.
Figure 7:
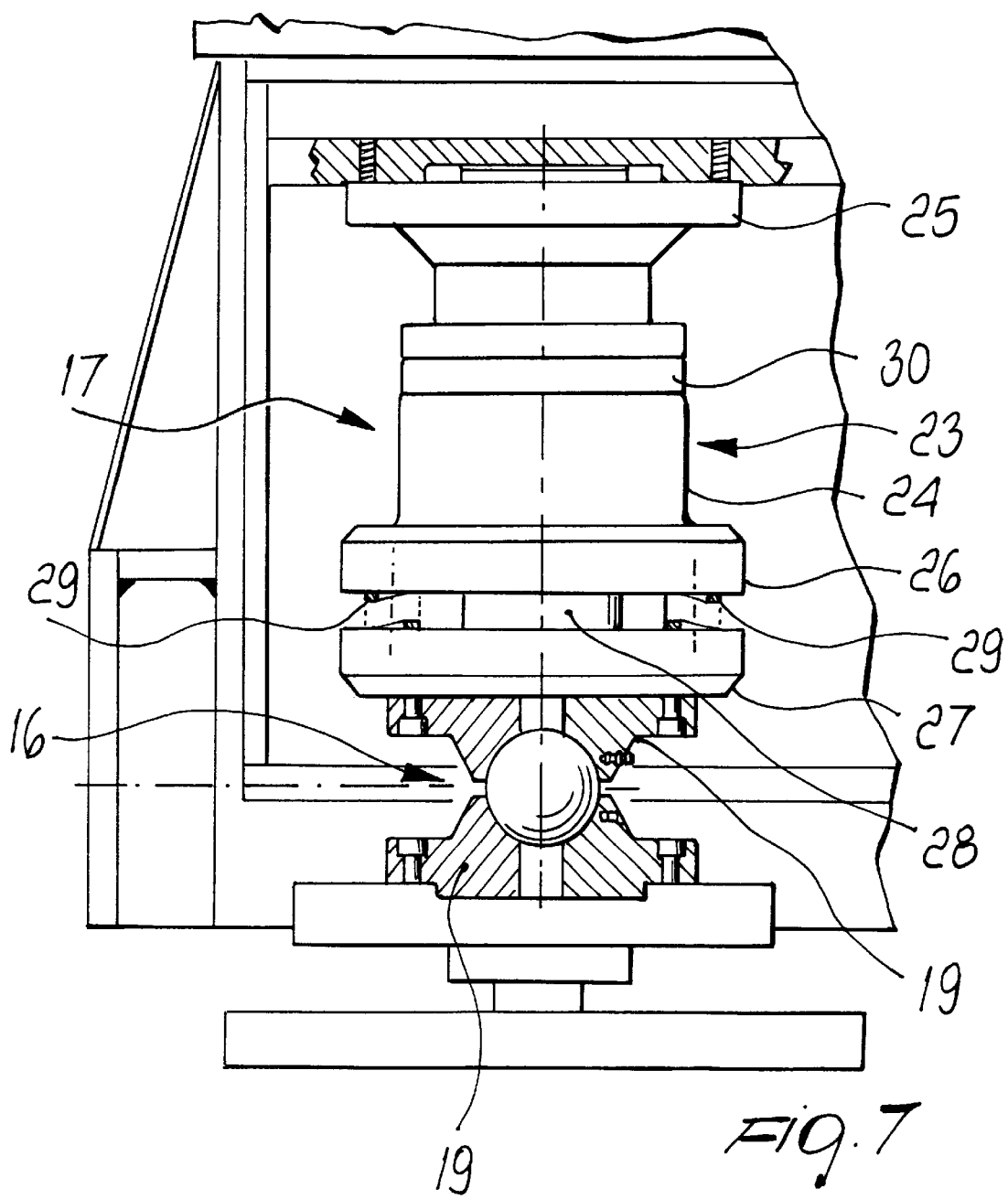
FIG. 7 is a general view of the telescopic support.
Figure 8:
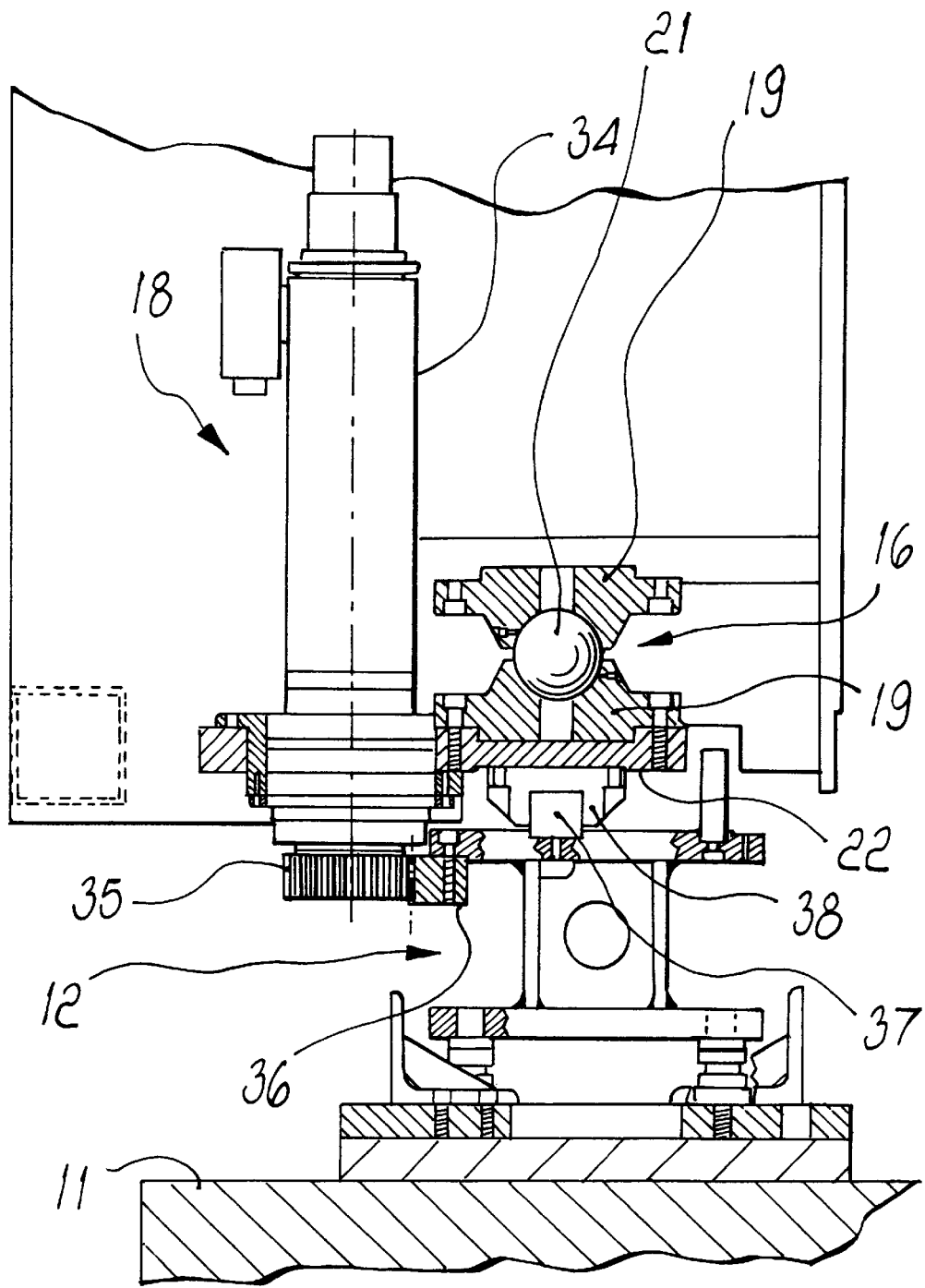
FIG. 8 is a general view of the transmission system of the machine.

With reference to the figures, a metal plate cutting machine, according to the present invention, is generally designated by the reference numeral 10.

In the configuration described hereinafter, the machine 10 is particularly preset for laser cutting, but the concepts presented can be easily adapted to other mentioned cutting methods, such as plasma, water and/or oxygen cutting.

The machine 10 comprises, on a supporting platform 11, two rails 12 for the longitudinal sliding of a portal-like structure, generally designated by the reference numeral 13, which slidingly supports a per se known type of cutting unit, for example a laser cutting head 14 associated with a control unit (typically of the numeric-control type, which is normally commercially available), not shown in the figures.

The portal-like structure is mounted on a supporting assembly 15 whose position can be adjusted along at least two axes and which comprises four supports 16 which have a spherical articulation, one support being associated, so as to form a vertically adjustable support for the structure, with extendible means 17 which are available for operator adjustment.

The machine 10 also has means 18 for the operating movement of the structure 13 and of the corresponding cutting head 14.

Each one of the four supports 16 is constituted by two mutually opposite flanged domes 19, each of which has a cavity 20 which is adapted to form, together with the opposite one, a seat for a ball 21; the upper dome 19 is fixed to the structure 13, while the lower one is fixed to a corresponding slider 22 for sliding on a corresponding rail 12.

In this case, the extendible means 17 are constituted by a telescopic device 23 which has a first outer tubular element 24 with flanged ends; one of the ends, designated by the reference numeral 25, is fixed to the structure 13, while the other one, designated by the reference numeral 26, faces and rests, by means of elastic elements described in detail hereinafter, on the flanged end 27 of a second longitudinally elongated element 28 which is slidingly inserted in the first element 24 and is associated so as to provide, together with the first element, the adjustability of the extension of the assembly.

The flanged end 27 of the second element 28 is fixed to the corresponding upper dome 19 of a corresponding support 16.

In this embodiment, the elastic elements interposed between the corresponding flanged ends 26 and 27 of the first and second elements, designated by the reference numerals 24 and 28 respectively, are constituted by a corresponding number of helical springs 29.

The telescopic device 23 also comprises a leveling adjustment ring 30 which is available to the action of the operator.

The portal-like structure 13, in this case, is constituted by two upright sides 31 and by an upper beam 32 for the sliding of the cutting head 14.

The beam 32 is fixed, at one end, to a corresponding side 31 and instead rests slidingly on the other side by means of linear guides 33 whose longitudinal extension lies transversely to the rails 12 so as to absorb any corresponding deformations (lack of parallelism) thereof or any errors during positioning and/or assembly.

The movement means 18 are constituted, as regards the movement of the portal-like structure 13, by two gearmotors 34 which are connected to the control unit; each gearmotor is fixed to a corresponding slider 22 and is provided with a pinion 35 meshing with a corresponding rack 36 which is fixed to the respective rail 12.

Each rail 12 has a linear guide 37 which has a quadrangular cross-section and is slidingly coupled to complementarily shaped sliding blocks 38 of corresponding sliders 22.

In practice it has been observed that the present invention has achieved the intended aim and objects.

In particular, the shape of the dome and the spherical articulation for each support allow, if the rails undergo rotations due to assembly errors or deterioration of the floor during the life of the machine, to avoid transferring any stress and deformation to the machine, ensuring the correct operating position of the machine at all times.

In order to further ensure that the entire machine always rests on the four resting points and that equivalent loads are discharged onto all the supports (balls), the extendible means, thanks to their vertically adjusted extension and the reaction of the springs, compensate for any unevenness in stress application, restoring perfect mutual co-planarity of the rails even when this does not actually occur.

A consequence of the above is that for the machine according to the present invention it is necessary to render only one of the two rails straight, while the other one, within certain limits, can even be non-rectilinear without compromising the functionality of the machine.

Another advantage of the machine according to the invention is that as a whole it is structurally simple.

Another advantage is that the machine according to the present invention has a simple operation which can be handled by the operator without particularly increasing or updating his technical skills.

The present invention is susceptible of numerous modifications and variations, all of which are within the scope of the same inventive concept.

The materials employed, so long as they are compatible with the contingent use, as well as the dimensions, may be any according to requirements.

All the details may be replaced with other technically equivalent elements.

The disclosures in Italian Patent Application No. PD99A000176 from which this application claims priority are incorporated herein by reference.

What is claimed is:

1. A machine for cutting metal plates by laser, plasma, water and/or oxygen cutting, comprising, on a supporting platform, at least two rails for longitudinal translatory sliding of a portal structure for slidingly supporting at least one cutting head which is associated with a control unit, wherein said portal structure is mounted on a supporting assembly whose position can be adjusted along at least two axes and wherein said supporting assembly comprises four supports with a spherical articulation, at least one of said supports being associated, so as to form a vertically adjustable support for said structure, with extendible means which are available for adjustment by the operator, movement means for the operating of said portal structure and of the corresponding at least one cutting head being provided.

2. The machine according to claim 1, wherein each one of said four supports is constituted by two mutually opposite flanged domes, each dome having a concavity designed to form, together with the opposite one, a seat for a ball, an upper one of said domes being fixed to the portal structure, a lower one being fixed to a corresponding slider for sliding on a corresponding rail of said two rails.

3. The machine according to claim 1, wherein said extendible means are constituted by a telescopic device which has a first external tubular element with flanged ends, one of which is fixed to said structure, another one facing and resting on the flanged end of a second longitudinally elongated element by means of elastic elements, said second element being slidingly inserted in said first element and being associated so as to provide, together with said first element, adjustability of the extendible means.

4. The machine according to claim 3, wherein the flanged end of said second element is fixed to the corresponding upper dome of a corresponding said support.

5. The machine according to claim 3, wherein said elastic elements interposed between the corresponding flanged ends of said first and second elements are constituted by a matching number of helical springs.

6. The machine according to claim 3, wherein said telescopic device comprises a leveling adjustment ring which is available to the action of the operator.

7. The machine according to claim 1, wherein said portal structure is constituted by two upright sides and by an upper beam for the sliding of the at least one cutting head, said beam being fixed, at one end, to a corresponding side and slidingly resting, on the other side, by means of linear guides whose longitudinal extension lies transversely to said rails so as to absorb any corresponding deformations of said rails.

8. The machine according to claim 1, wherein said movement means are constituted, as regards the movement of said portal structure, by two gearmotors which are connected to the control unit, each gearmotor being fixed to a corresponding upright and slider and having a pinion for coupling to a corresponding rack which is fixed to a respective rail of said at least two rails.

9. The machine according to claim 1, wherein each one of said rails has a linear guide with a quadrangular cross-section which is slidingly coupled to complementarily shaped sliding blocks of corresponding sliders.

* * * * *